March 15, 1932.  A. BUCHI  1,849,170
INTERNAL COMBUSTION ENGINE PROVIDED WITH EXHAUST TURBINES AND COMPRESSORS
Filed Dec. 16, 1925    6 Sheets-Sheet 1

Inventor:
Alfred Buchi
By Henry Orth
atty.

March 15, 1932.  A. BUCHI  1,849,170
INTERNAL COMBUSTION ENGINE PROVIDED WITH EXHAUST TURBINES AND COMPRESSORS
Filed Dec. 16, 1925  6 Sheets-Sheet 2

Inventor
Alfred Buchi,
By
Atty.

March 15, 1932.   A. BUCHI   1,849,170
INTERNAL COMBUSTION ENGINE PROVIDED WITH EXHAUST TURBINES AND COMPRESSORS
Filed Dec. 16, 1925   6 Sheets-Sheet 4

FIGS. 14-20 INCLUSIVE ILLUSTRATE THE OPERATION OF THE ENGINES OF FIGS. 5 AND 13.

FIG.14 SCAVENGING

FIG.18 POWER STROKE

FIG.21 SCAVENGING

FIG.15 SUCTION

FIG.19 EXHAUST HIGH PRESSION

FIG.16 SUCTION-COMPRESSION

FIG.20 EXHAUST LOW PRESSION

FIG.22 COMPRESSION STROKE

FIG.17 COMPRESSION

FIG.23 POWER STROKE

FIGS. 21-25 INCLUSIVE ILLUSTRATE THE OPERATION OF THE ENGINE OF FIG.6.

FIG.25 EXHAUST LOW PRESSURE AND START OF SCAVENGING

FIG.24 EXHAUST HIGH PRESSURE

INVENTOR:
Alfred Büchi,
By Sommers & Young.
Attys.

FIG.26
SCAVENGING

FIG.28
POWER STROKE

FIG.27
COMRESSION STROKE

FIG.29
EXHAUST HIGH PRESSURE

FIGS. 26-30 INCLUSIVE
ILLUSTRATE THE OPERATION
OF THE ENGINE OF FIG. 7.

FIG.30
EXHAUST LOW
PRESSURE AND
START OF SCAVENGING

INVENTOR:
Alfred Buchi
By
Sommers & Young
Attys.

Patented Mar. 15, 1932

1,849,170

UNITED STATES PATENT OFFICE

ALFRED BUCHI, OF WINTERTHUR, SWITZERLAND

INTERNAL COMBUSTION ENGINE PROVIDED WITH EXHAUST TURBINES AND COMPRESSORS

Application filed December 16, 1925, Serial No. 75,774, and in Germany December 24, 1924.

The present invention refers to a special arrangement of the constituent parts and design of an aggregate comprising an internal combustion engine provided with compressors for compressing the charge to be supplied to the engine and with which the energy of the exhaust gases is utilized in turbines. With two-stroke cycle internal combustion engines working with partial admission of precompressed air it has already been proposed to attain the complete expansion of the exhaust gases down to the backpressure by utilizing the total work of the piston engine for performing the precompression and by causing the exhaust gases to expand to an intermediate pressure which corresponds theoretically to the pressure of the charging air and only then admitting the exhaust gases to a single turbine which is the sole machine of the power plant to produce external work.

The object of the present invention is also to utilize the complete expansion of the exhaust gases, however this is effected by means of a different arrangement. The feature thereof is that before the end of the expansion stroke in the internal combustion engine and whilst a sudden drop in pressure occurs the exhaust gases produce simultaneously useful work on the one hand in the internal combustion engine and on the other hand in a first turbine, whereafter they flow over into a second turbine for producing further useful work. The arrangement may be such that both turbines drive the same shaft. Both turbines or one or the other turbine may for instance be used for driving the compressor for the charge or electric generators, or both turbines may be coupled with the internal combustion engine. Further means may be provided for introducing scavenging air flowing through the internal combustion engine into the first turbine or into the second or into both turbines. Further the arrangement may be so made that with certain loads or working conditions all the exhaust gases flow only to the second turbine on leaving the internal combustion engine.

The invention will be more readily understood by the aid of the accompanying drawings, in which several constructional examples are illustrated.

Figure 1:
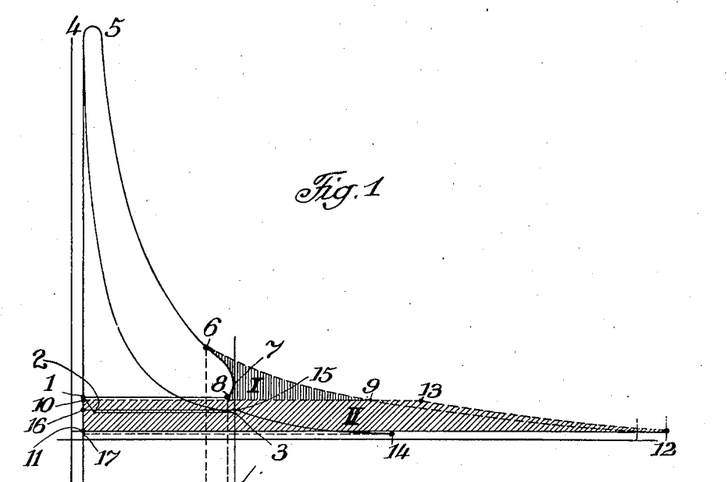
Figs. 1 and 2 show the working diagram of four-stroke cycle internal combustion engines according to the present invention, Figs. 3 and 4 refer to two-stroke cycle internal combustion engines.
Figure 2:
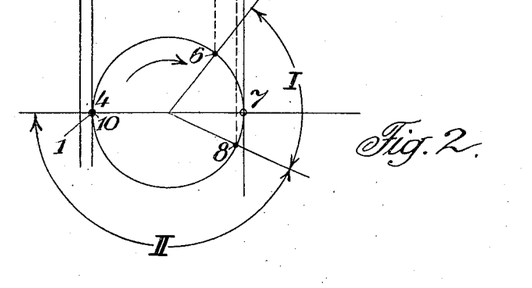

In the indicator diagram illustrated in Fig. 1 wherein the ordinates represent the working pressures and the abscissæ the volumes, the area 1, 2, 3, 4, 5, 6, 7, 8, 1 is the indicator diagram of the four-stroke cycle internal combustion engine. 1, 2, 3 corresponds to the suction stroke, 3, 4 to the compression stroke and 4, 5, 6, 7, to the combustion and expansion stroke. At 6 a portion of the exhaust gases begins to flow into the first turbine whilst a large drop in the pressure to the point 8 occurs and between 8 and 1 the remainder of the exhaust gases still in the engine are expelled into the second turbine. The ideal work diagram of the first turbine is indicated by the vertically sectioned area 6, 7, 8, 9, 6 (I), and the ideal work diagram of the second turbine is shown by the obliquely sectioned area 10, 11, 12, 13, 10 (II). Fig. 2 illustrates the succession in time of the processes according to Fig. 1 during one revolution of the crank shaft, i. e. during the expansion and the exhaust stroke of the engine. Corresponding points in Figs. 1 and 2 are designated by similar reference numerals. The path of the crank pin is indicate by the circle 4, 6, 7, 8, 10. The work performed by the exhaust gases during the sudden drop of pressure in the engine and in the first turbine occurs during the path of the crank 6, 7, 8. Thereupon the work performed by the exhaust gases in the second turbine takes place during the paths of the crank 8, 1 and 8, 10.

14, 15, 16, 17, 14 denotes the ideal indicator diagram of the compressor which supplies the precompressed charge to the engine. The angle of rotation of the crank corresponding to the work of the first turbine is designated by I, and II denotes the angle corresponding to the work of the second turbine.

The shown differences in pressure between the exhaust stroke 8, 1 of the engine and the pressure of admission 10, 9, 13 into the second turbine are caused by the loss of pressure during the flow of the exhaust gases from the internal combustion engine into the turbine. In a similar manner losses of pressure occur during the suction period of the pre-compressor according to the suction line 17, 14 as compared with the line indicating atmospheric pressure and during the charging of the cylinders of the internal combustion engine according to the line 1, 2, 3 as compared with line 16, 15. During the flow of the exhaust gases into the second turbine according to the line 10, 9, 13 the pressure may somewhat change and may not be constant as shown in the diagram.

Figure 3:
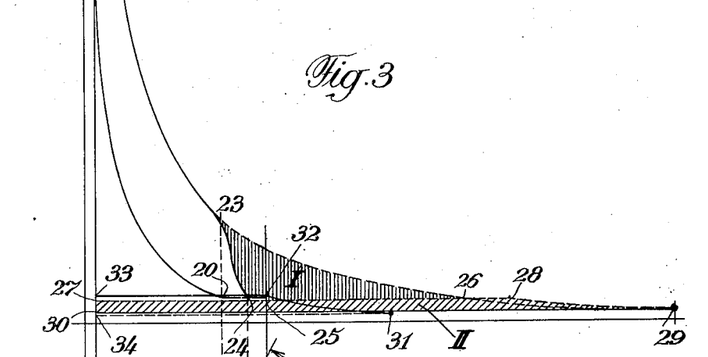
Figure 4:
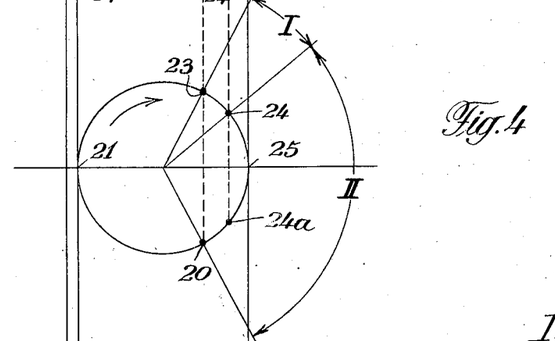

Figs. 3 and 4 show the manner of working according to the present invention with a two-stroke cycle internal combustion engine by means of an indicator diagram (Fig. 3) and a crank path diagram (Fig. 4).

In Fig. 3, 20, 21, 22, 23, 24, 25, 20 denotes the indicator diagram of the two-stroke cycle internal combustion engine; 20, 21 denotes the line of compression and 21, 22, 23 corresponds to the combustion and expansion period. During the line 23, 24 the flow of a portion of the exhaust gases into the first turbine occurs. 24 to 25 and back to 24 corresponds to the scavenging period, that is to say during the corresponding movement of the piston the remainder of the exhaust gases which is still in the cylinders of the engine are driven out by the fresh charge. During 24—20 the scavenging action may be continued or a charging may occur and at 20 the compression proper starts.

The ideal indicator diagram of the first turbine is represented by the area 23, 24, 26, 23, i. e. by the vertically sectioned area I. The combustion gases expelled from the engine during the path of the piston 24, 25, 20 as well as the combustion gases leaving the turbine I enter the turbine II and perform together the work indicated by the area 27, 28, 29, 30, 27 of the diagram. This area is designated by II and is obliquely sectioned. The indicator diagram of the pre-compressor compressing the charge of the engine is represented by the area 31, 32, 33, 34, 31.

It will be seen from Fig. 4, in which similar points are designated by the same reference numerals as in Fig. 3, that during the path of the crank 23, 24 corresponding to the angle I of movement of the crank work is simultaneously performed in the engine and in the first turbine whilst a considerable drop of pressure occurs. Thereupon the scavenging of the cylinder of the engine and the expelling of the remainder of the exhaust gases in the engine occurs during the path 24, 25, 24a, 20 of the crank and the flow of these gases into the second turbine corresponding to the angle II of the movement of the crank. When the piston of the engine is in a position corresponding to the point 20 the scavenging valves and exhaust organs are closed and the connections between pre-compressor-engine-exhaust-turbines are interrupted. The compression within the engine starts now which is represented by the line 20, 21.

Figure 5:
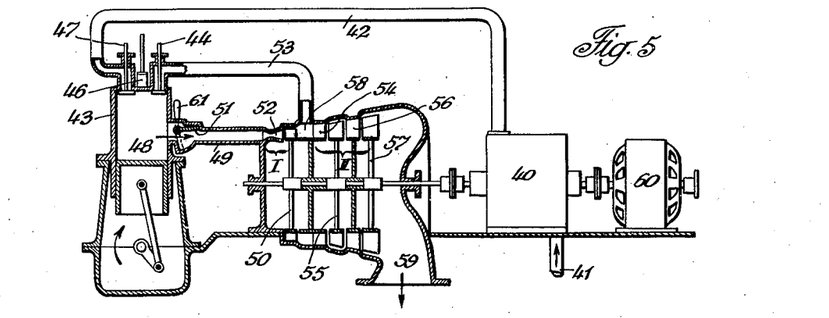
Fig. 5 shows in a diagrammatic manner with parts shown in section a constructional example of an arrangement of machines including a four-stroke cycle internal combustion engine and Figs. 6 and 7 show in a diagrammatic manner and partly in section constructional examples of arrangements of machines including a two-stroke cycle internal combustion engine.

Fig. 5 shows diagrammatically a constructional example of a plant working in accordance with the diagrams illustrated in Figs. 1 and 2. 40 denotes the pre-compressor which sucks the charge, for instance atmospheric air or the combustible mixture, through the conduit 41 and supplies it in a compressed state by the conduit 42 and through the admission valve 47 to the four-stroke cycle internal combustion engine of which only one cylinder 48 is shown. 45 designates the piston which in the position illustrated is near its lower dead centre position. To ensure the aggregate to operate according to the present invention the cylinder 48 is in connection with the turbine I by a conduit 49. In the latter a cut-off organ 51 which may act automatically or which may be positively controlled by means of a lever 61 may be inserted. As the turbine I comprising a rotor wheel 50 has to work with a considerable decrease in pressure the cross-sectional area of the conduit 49 is chosen so small that the gases flow through the latter at a high speed and that no accumulation of the gases occurs therein. The inlet nozzles 52 of the turbine I are so chosen that yet a good utilization of the expansion energy of the exhaust gases is effected.

A second conduit 53 for the exhaust gases conducts the portion of the exhaust gases which remained in the cylinder 48 into the turbine II during the exhaust stroke of the engine. In the example illustrated the turbine II comprises a first guide wheel 54, a first rotor wheel 55, a second guide wheel 56 and a second rotor wheel 57. Obviously the turbine I may be provided with more than one rotor wheel and the turbine II may also comprise one or more rotor wheels. In contradistinction to the conduit 49 the cross-sectional areas of the conduit 53 and of the passages in the turbine II are advantageously so chosen that the exhaust gases flow at an approximately constant pressure into the turbine II. In the example illustrated the turbine rotor wheels 50, 55 and 57 are fixed on a shaft common to all the wheels. The exhaust gases leaving the rotor wheel 50 flow into the receiver or collector space and also enter from there the turbine II, pass through the latter and leave by the exhaust branch 59.

The manner of operation of the powerplant is now such that towards the end of the complete expansion in the engine, i. e. when the piston is near its lower dead centre position (in the position illustrated in Figs. 5 and 19) exhaust gases are permitted to flow from the cylinder 48 to the turbine I through the conduit 49. The non-return valve 51 is opened by the overpressure existing in the engine cylinder 48 and a portion of the exhaust gases flows into the turbine I whereby a considerable drop in pressure occurs. This flow lasts for such a period until after no essential over-pressure exists in the cylinder in comparison to the pressure in the admission chamber 58 to the turbine II. In this moment the valve 44 is opened (Fig. 20) and the piston which now moves in the upward direction, expels the exhaust gases that remained in the cylinder for further useful work through the conduit 53 into the turbine II.

Figures 14, 15, 16, 17, 18, 19, 20, 21, 22, 23, 24, 25:
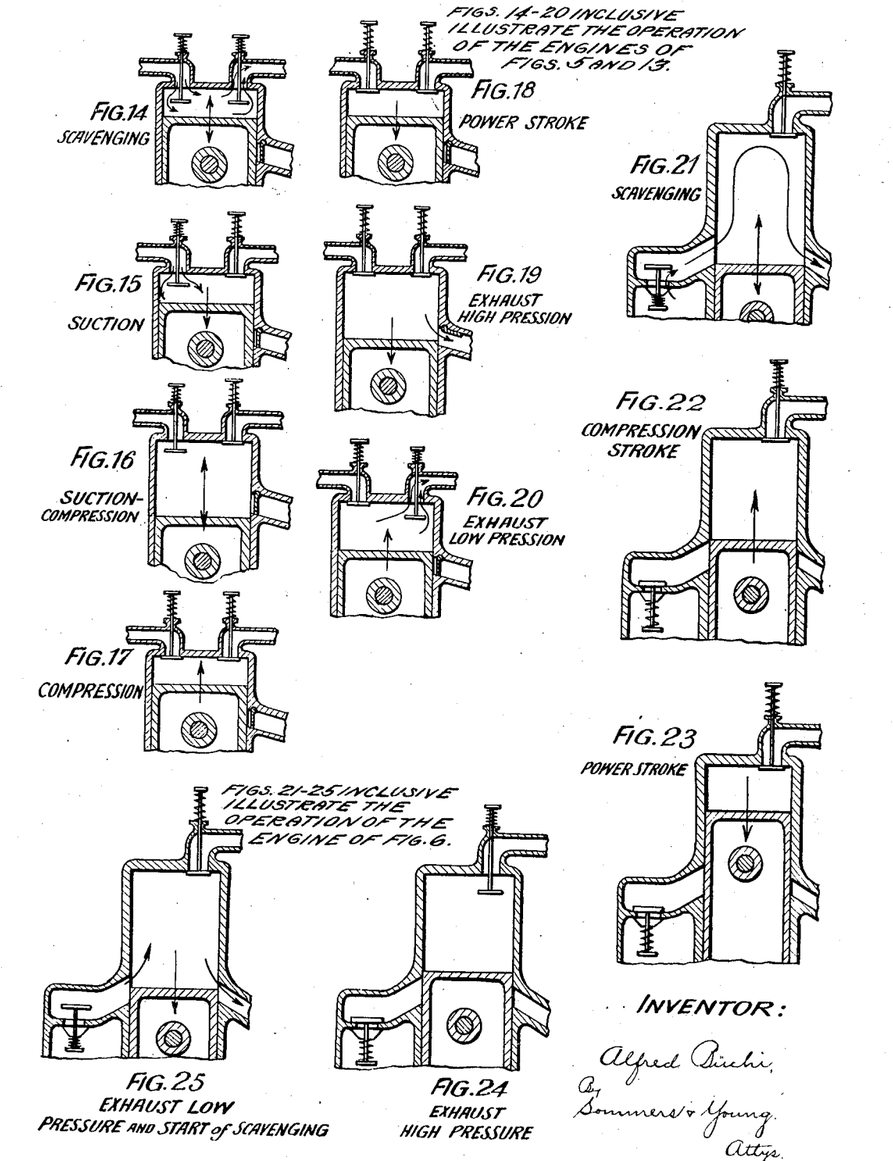

Meanwhile the valve 51 is closed again and the flow of exhaust gases past this valve into the turbines I and II is interrupted. At the end of the expulsion or exhaust stroke the valve 44 is again closed the admission valve 47 is opened (Fig. 15) and the suction stroke during which the fresh charge enters the cylinder in the manner known with four-stroke cycle engines occurs, at the end of the suction stroke the piston uncovers again the conduit 49 (Fig. 16). The non-return valve 51 closes either automatically against the suction pressure inside the cylinder, or the valve is closed through the medium of the lever 61 (Fig. 5), and prevents that in this moment the exhaust gases from the conduit 49 or from the turbine I flow into the cylinder 48.

Figures 8, 9:
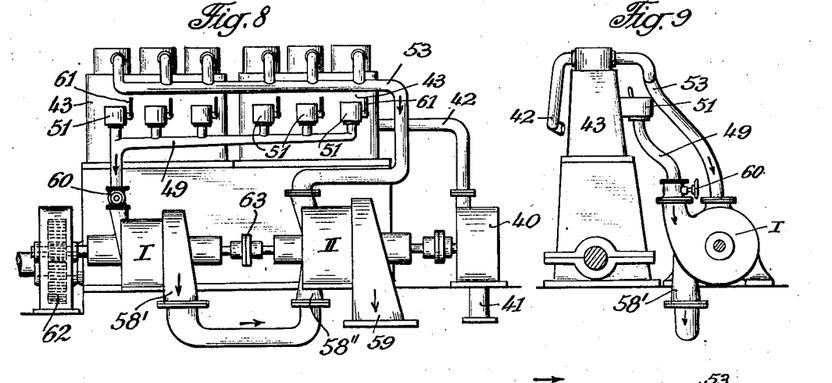
Figs. 8 and 9 show in an elevation view and in an end view respectively a further constructional example.
Figure 13:
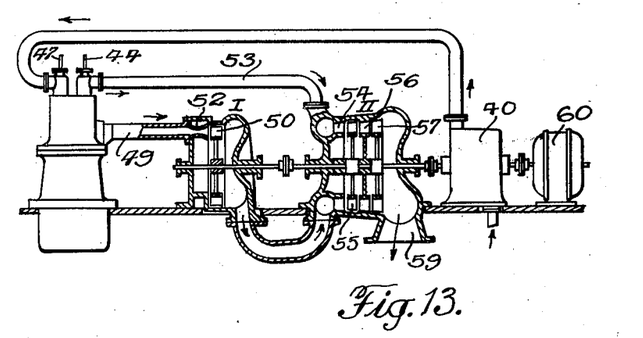
Fig. 13 is a view similar to Fig. 5, but having the two turbines built as separate units as in Fig. 8, Figs. 14–20 illustrate diagrammatically the mode of operation of the engines of Figs. 5 and 13, Figs. 21–25 illustrate diagrammatically the mode of operation of the engines of Fig. 6, Figs. 26–30 illustrate diagrammatically the mode of operation of the engine of Fig. 7.

The exhaust turbines may be utilized for delivering exterior work, for instance for driving an electric generator 60, in addition to driving the compressor 40. Instead of arranging the turbines I and II in one casing common to both, they may also be arranged in separate casings as is illustrated in Figs. 8, 9 and 13. In this case the exhaust branch 58' of the turbine I is connected to an inlet branch 58" of the turbine II. Further the turbines I and II may be mechanically coupled to the internal combustion engine by means of a transmission gearing 62 (Fig. 8) interposed between the shaft of the turbines and the shaft of the engine as is indicated in Fig. 8. The turbines I and II may be independent of each other, i. e. not mechanically coupled by omitting the coupling 63 shown in Fig. 8.

Figure 6:
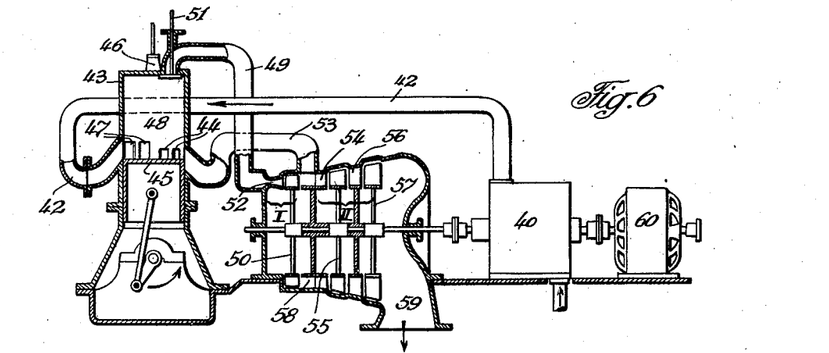
Figure 7:
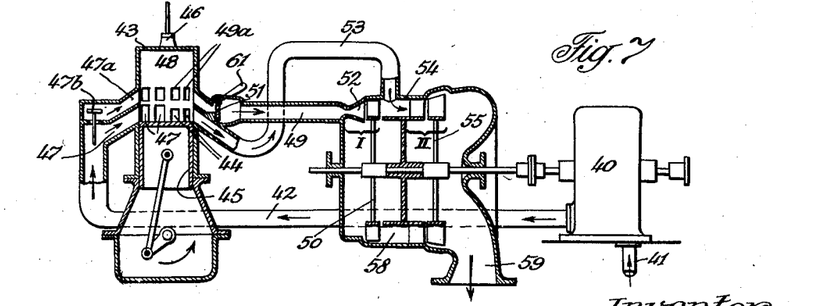

Figs. 6 and 7 represent power plants having two-stroke cycle internal combustion engines. Similar parts are designated by the same reference numerals as in Fig. 5.

With the arrangement illustrated in Fig. 6 the precompressor 40 supplies the charge through the conduit 42 and the admission ports 47 into the engine cylinder 48.

The valve 51 is so controlled that with a position of the piston 45 corresponding to the line 23, 24 of the diagram illustrated in Fig. 3, the flow of the considerably expanding exhaust gases through the conduit 49 into the turbine I occurs, the latter comprising a rotor wheel 50 on which the exhaust gases flowing through the nozzles 52 act. During this proceeding the piston 45 still covers the ports 47 and 44 in the walls of the cylinder (Fig. 24). These ports are only uncovered towards the ends of the stroke when the piston 45 is in the position illustrated (Fig. 6). From this moment fresh charge enters the cylinder 48 through the ports 47 and the exhaust gases still present in the cylinder are expelled through the ports 44 (Figs. 25 and 21) and flow through the conduit 53 into the turbine II which comprises guide wheels 54 and 56 and rotor wheels 55 and 57. These exhaust gases together with the exhaust gases leaving the turbine I perform work in the turbine II and escape then through the exhaust branch 59 into the atmosphere. 46 denotes a fuel valve. The latter is not required in case the precompressor 40 deals with a mixture of fuel and air.

With the arrangement illustrated in Fig. 7, the introduction of the pre-compressed charge is effected by means of two rows of ports 47 and 47a arranged one above the other, whereby the passage from the cylinder 48 through the upper row of ports 47a to the conduit 42 may be closed by valve 47b. Further supply conduits 49 and 53 to the turbines are in connection with the ports 49a and 44 respectively provided in the wall of the cylinder. A non-return valve 51 is inserted in the conduit 49, which may also be operated by the lever 61.

Figures 27, 29:
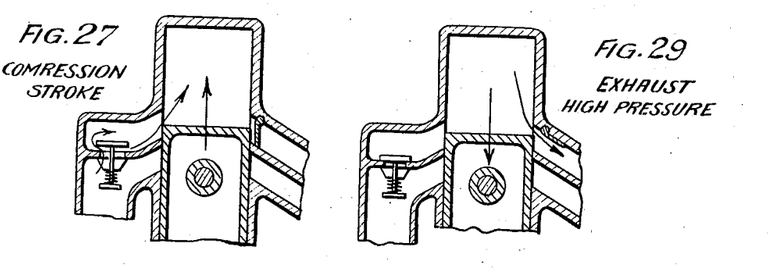
Figure 28:
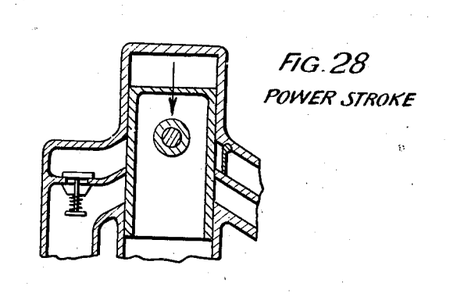
Figure 30:
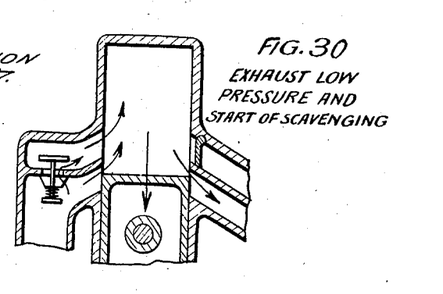

During the downward movement of the piston (Fig. 29) the latter uncovers first the slots 49a and 47a. As long as an over-pressure is present within the cylinder the valve 47b prevents the flow of exhaust gases into the supply conduit 42. On the other hand this over-pressure opens the non-return valve 51 and the exhaust gases flow through the conduit 49 and the nozzles 52 to the rotor wheel 50 of the turbine I. This flow lasts until after the pressures in the conduit 49 and in the collector space 58 are very nearly equalized. Approximately in this moment the piston 45 uncovers the outlet ports 44 and the admission ports 47 (Fig. 30). The pre-compressed charge enters the cylinder 48 and forces the exhaust gases through the ports 44 into the conduit 53 and to the turbine II, in which these gases together with the exhaust gases leaving the turbine I perform useful work. The valve 47b opens as soon as a certain over-pressure in the conduit 42 above that in the interior of the cylinder is present (Fig. 27). Then fresh charge also enters the cylinder through the upper slots 47a.

Figure 26:
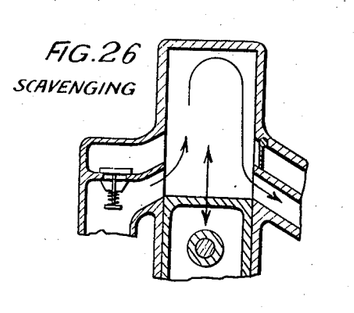

The arrangement of the inlet and outlet organs may be made in any suitable manner. With the constructional examples shown in Figs. 5, 6 and 7 a scavenging by means of the fresh charge may be effected through the conduit 49 into the turbine I as well as through the conduit 53 into the turbine II. The only condition is that the parts 47 and 51 or 47 or 47a respectively and 44 may simultaneously remain opened (Figs. 14, 21 and 26).

The means for controlling the internal combustion engine may be so adjusted and the quantity of air delivered by the compressor 40 must be so large that after the exhaust gases which expand first have passed through the conduit 49 into the turbine I or during the passing of exhaust gases having a lower pressure through the conduit 53 into the turbine II the inlet and outlet valves 47 and 44 remain simultaneously open for a certain time, so that the air which is delivered in an excess quantity by the compressor 40 may be led through the cylinders and the above mentioned conduits 49 and 53 into the turbine.

The control of the valve 51 may be so arranged that the latter may for instance be kept closed with certain loads of the engine so that the turbine II only is acted upon by the exhaust gases. This is to be recommended if in case of small loads and a corresponding small fuel admission the drop in pressure between 6 and 8 in Fig. 1 or from 23 to 24 in Fig. 3 has become so small that a utilization of this energy in the turbine I is no longer economical. Further a valve 60 (Fig. 8) may be inserted in the conduit 49 leading to the turbine I in order to prevent the exhaust gases to act on turbine I.

Figure 10:
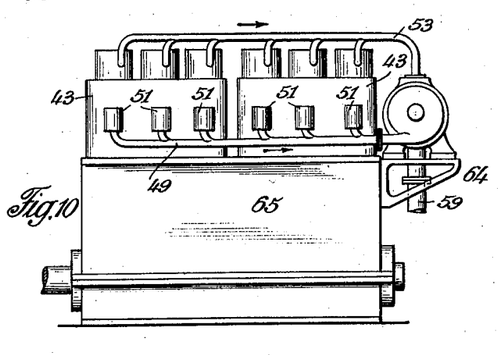
Figs. 10 and 11 show in an elevation view and in an end view respectively a further constructional example in which the turbine and the compressor are supported on the frame of the engine at the height of the cylinders.
Figure 11:
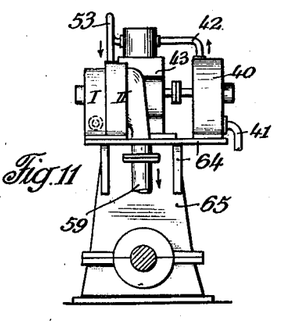

A constructional example of the aggregate is illustrated in Figs. 10 and 11 in which the turbines I and II together with the compressor 40 are arranged on brackets 64 fixed to the bed plate 65 of the engine in the height of the cylinders, which arrangement ensures short connecting conduits between the engine and the turbines and the compressor.

Figure 12:
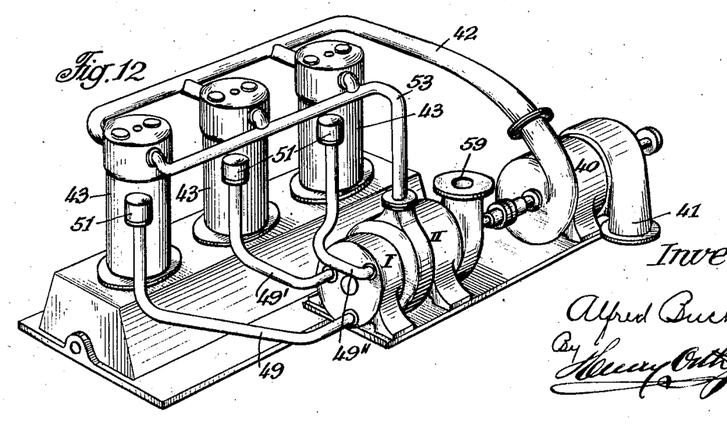
Fig. 12 is a perspective view of another constructional example.

With multicylinder-internal combustion engines separate conduits 49 and nozzles 52 may be provided for conducting the exhaust gases to the turbine I from every cylinder in order to avoid mutual disturbances. A constructional example embodying this feature is illustrated in Fig. 12 of the drawings, in which the conduits 49, 49' and 49" lead from the three-cylinders 43 of the engine to the turbine I.

Obviously the present invention is not restricted to single acting internal combustion engines, and double acting engines or engines having pistons working in opposite directions may be used.

I claim:

1. A prime mover comprising an internal combustion engine having cylinders, exhaust means exclusively for high pressure exhaust gases, exhaust means exclusively for low pressure exhaust gases, an exhaust turbine having high and low pressure stages, ducts conveying said high pressure exhaust gases to the high pressure stage of said turbine, ducts to convey the low pressure exhaust gases directly to the low pressure stage of the turbine, a compressor supplying the charge to said internal combustion engine and driven by the exhaust turbine, a check valve inserted in the high pressure conduit, closing against the combustion cylinders when the pressure therein is lower than in the high pressure stage of the turbine.

2. A prime mover comprising an internal combustion engine having cylinders, exhaust means exclusively for high pressure exhaust gases, exhaust means exclusively for low pressure exhaust gases, an exhaust turbine having high and low pressure stages, ducts conveying said high pressure exhaust gases to the high pressure stage of said turbine, ducts to convey the low pressure exhaust gases directly to the low pressure stage of the turbine, a compressor supplying the charge to said internal combustion engine and driven by the exhaust turbine, means to control the flow of the exhaust gases in said ducts so that with a sudden pressure drop a quantity of said exhaust gases is admitted to said high pressure wheel of the turbine and the remainder of said exhaust gases performs useful work in the internal combustion engine and is then admitted to said lower pressure stage of the turbine together with the exhaust gases being discharged from the high pressure stage.

3. A prime mover comprising a multi-cylinder internal combustion engine, exhaust means exclusively for high pressure exhaust gases, exhaust means exclusively for low pressure exhaust gases, said exhaust means for high pressure being piston controlled ports and said exhaust means for low pressure being a valve in the cylinder head and means to actuate said valve, an exhaust turbine having high and low pressure stages, ducts conveying said high pressure exhaust gases to the high pressure stage of said turbine, ducts to convey the low pressure exhaust gases directly to the low pressure stage of the turbine, a compressor supplying the charge to said internal combustion engine and driven by the exhaust turbine, a check valve inserted in the high pressure conduit, closing against the combustion cylinders when the pressure therein is lower than in the high pressure stage of the turbine.

In testimony whereof, I have signed my name to this specification.

ALFRED BUCHI.